(12) United States Patent
Turner et al.

(10) Patent No.: US 6,249,106 B1
(45) Date of Patent: Jun. 19, 2001

(54) APPARATUS AND METHOD FOR MAINTAINING A THRESHOLD VALUE IN A BATTERY

(75) Inventors: Steven Richard Turner; Kaushik Rajashekara, both of Carmel; Tracy Frye Strickland, Noblesville, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/666,581

(22) Filed: Sep. 21, 2000

(51) Int. Cl.⁷ .................................................. H02J 7/00
(52) U.S. Cl. .............................................. 320/136
(58) Field of Search .................. 320/127, 134, 320/135, 136

(56) References Cited

U.S. PATENT DOCUMENTS

| | | | |
|---|---|---|---|
| 4,493,001 | 1/1985 | Sheldrake | 320/135 |
| 4,876,513 | 10/1989 | Brilmyer et al. | 320/136 |
| 4,902,956 | 2/1990 | Sloan | 320/135 |
| 5,066,905 | 11/1991 | Betton et al. | 324/133 |
| 5,089,762 | 2/1992 | Sloan | 320/127 |
| 5,119,011 * | 6/1992 | Lambert | 320/136 |
| 5,193,067 | 3/1993 | Sato et al. | 320/134 |
| 5,200,877 | 4/1993 | Betton et al. | 320/146 |
| 5,295,078 * | 3/1994 | Stich et al. | 320/136 |
| 5,296,997 | 3/1994 | Betton et al. | 320/136 |
| 5,321,627 | 6/1994 | Reher | 320/DIG. 21 |
| 5,332,958 | 7/1994 | Sloan | 320/136 |
| 5,412,323 | 5/1995 | Kato et al. | 320/152 |
| 5,432,429 * | 7/1995 | Armstrong, II et al. | 320/136 |
| 5,680,050 | 10/1997 | Kawai et al. | 324/427 |
| 5,691,619 | 11/1997 | Vingsbo | 320/127 |
| 5,864,237 | 1/1999 | Kawai et al. | 324/430 |
| 5,900,734 | 5/1999 | Munson | 324/433 |

OTHER PUBLICATIONS

Turner et al, "Battery Protection System and Method", copending US patent application, Attorney Docket No. DP–300140, filed concurrently with this application.

Turner et al, "Method and Apparatus for Sensing the Status of a Vehicle", copending US patent application, Attorney Docket No. DP–300141, filed concurrently with this application.

* cited by examiner

Primary Examiner—Peter S. Wong
Assistant Examiner—Pia Tibbits
(74) Attorney, Agent, or Firm—Margaret A. Dobrowitsky

(57) ABSTRACT

A battery protection system for a battery having a switching mechanism positioned intermediate to the positive terminal and an electrical load of the battery. A controller manipulates the switching mechanism between an open position and a closed position, the closed position connects the electrical load to the battery and the open position disconnects the electrical load from the battery. The battery protection system utilizes a battery state-of-charge detection system, which instructs the controller to open the switching mechanism when the detection system detects a battery state-of-charge that is lower than a threshold value. The battery protection system is also equipped with a vehicle status detection system, which instructs the controller to close the switching mechanism when a vehicle startup condition is detected by the vehicle status detection system.

27 Claims, 7 Drawing Sheets

APPARATUS AND METHOD FOR MAINTAINING A THRESHOLD VALUE IN A BATTERY

TECHNICAL FIELD

The present invention relates to an apparatus and method for determining the operational status of an automobile. In particular, the present invention provides a method and apparatus for protecting and maintaining the charge within a battery.

BACKGROUND OF THE INVENTION

Motor vehicles, such as cars, marine vessels, trucks and the like almost universally include a battery that is used for engine ignition. The battery is also electrically connected to other electrical loads in the vehicle, such as hazard lights, radios, running lights, etc. Typically, a generator or alternator, driven by the engine, provides an electrical current for recharging the battery.

Oftentimes, the engine is shutoff and the battery continues to drive an electrical load in the vehicle and, in doing so, discharges the battery. In some cases, this can be inadvertent, such as leaving the headlights on, leaving the radio on, leaving the ignition keys in the accessory or on position, or through a malfunction in the electrical circuit. In any event and after a period of time, the battery will discharge to such an extent that engine cranking using the charge in the battery is impossible.

Accordingly, and in order to maintain a minimal threshold charge value in an automotive battery, it would be desirable to have a battery protection system which would disconnect the battery from an electrical load or draw, if the battery discharges below a set value. In addition, the system would need to distinguish the current status of the automobile (i.e. engine running) and the type of electrical systems being driven by the battery (i.e. hazard lights) in order to provide the system with a "fail-safe" protection system so that the battery is not disconnected from driving critical systems.

Moreover, the system will also be required to determine when to reconnect the battery in order to drive such systems.

In connecting a battery to a supply of D.C. power of the same voltage rating such as a battery charger, the battery and supply must be connected with their polarities matched. If the polarities are mismatched, a high-current condition might occur. The results will be possible damage to the battery or damage to the electrical components of the vehicle.

A similar situation may occur when a motorist attempts to "jump start" a vehicle having a dead battery, by using jumper cables to connect the dead battery to a vehicle having a fully charged battery. It is important that the positive terminal of the first battery be connected to the positive terminal of the second battery, and likewise for the negative terminals. However, it is not always possible to guarantee correct polarity matching. In a first situation, an unsophisticated motorist may not know how to properly connect the jumper cables. In a second situation, it may be difficult to determine the polarities of the batteries. This latter situation can occur when the polarity indicating indicia on the batteries is covered with oil and dirt, at night when the indicia is difficult to read, or in the haste and frustration that arises from attempting to jump start a car during extremely adverse weather conditions. Even under ideal circumstances, errors in matching polarities can still occasionally occur due to simple oversight.

In those instances in which polarities are mismatched during an attempt to start a stranded car, not only can the error cause damage to both vehicle electrical systems, but such damage may result in both vehicles becoming disabled in a remote location. For these reasons, it is highly desirable to prevent mismatching of battery polarities when a motorist is attempting to jump-start a stranded vehicle.

Accordingly, there is a need for a battery protection system that prevents the damage to the battery from short circuits or improper jump-start conditions. In addition, there is also a need for a battery protection system wherein the battery maintains a minimal charge for operating essential systems, such as the starter motor of an automobile.

SUMMARY OF THE INVENTION

A smart battery system designed to provide crank protection includes additional features such as battery discharge protection.

The crank protection uses an electronic switch, i.e. FET, which opens to disconnect the battery from the vehicle electrical load to guarantee that adequate cranking energy is always available. The reconnection of the battery is transparent to the user. A re-connect occurs when the brake pedal is depressed, the hazard lights are turned on or the starter motor is turned on. If the hazard lights are activated, the battery protection system is inhibited from disconnecting the battery. If the engine is running, the battery protection system is inhibited from disconnecting the battery from the vehicle load. A manual switch is available to act as a backup.

If a dead short occurs between the battery negative and the positive terminal of the battery protective system, as may happen in a crash, the electronic switch opens, thus disconnecting the battery from the vehicle load. Additionally, if a jump-start is attempted with reverse polarity, the battery is disconnected. The short circuit and reverse polarity protection features may be part of a simpler embodiment that does not include the crank protection features.

An exemplary embodiment of the inhibit-disconnect detection comprises detection of AC signals on the vehicle electrical load that represent hazard light activation or engine running condition. The transparent detection also detects transient changes in a DC voltage across the vehicle electrical load during FET open conditions.

An exemplary embodiment of a standalone short circuit and reverse polarity system includes the electronic switch and an excessive current draw detection condition. The excessive current draw detection would not include an engine start condition that normally has a relatively high current condition.

The battery protection system includes a manual switch that allows the battery protection system to be turned off. With this switch in the off position, the battery is disconnected. With the switch in the on position, the battery protection system is enabled.

The above-described and other features and advantages of the present invention will be appreciated and understood by those skilled in the art from the following detailed description, drawings, and appended claims.

DESCRIPTION OF THE PREFERRED EMBODIMENT

Figure 1:
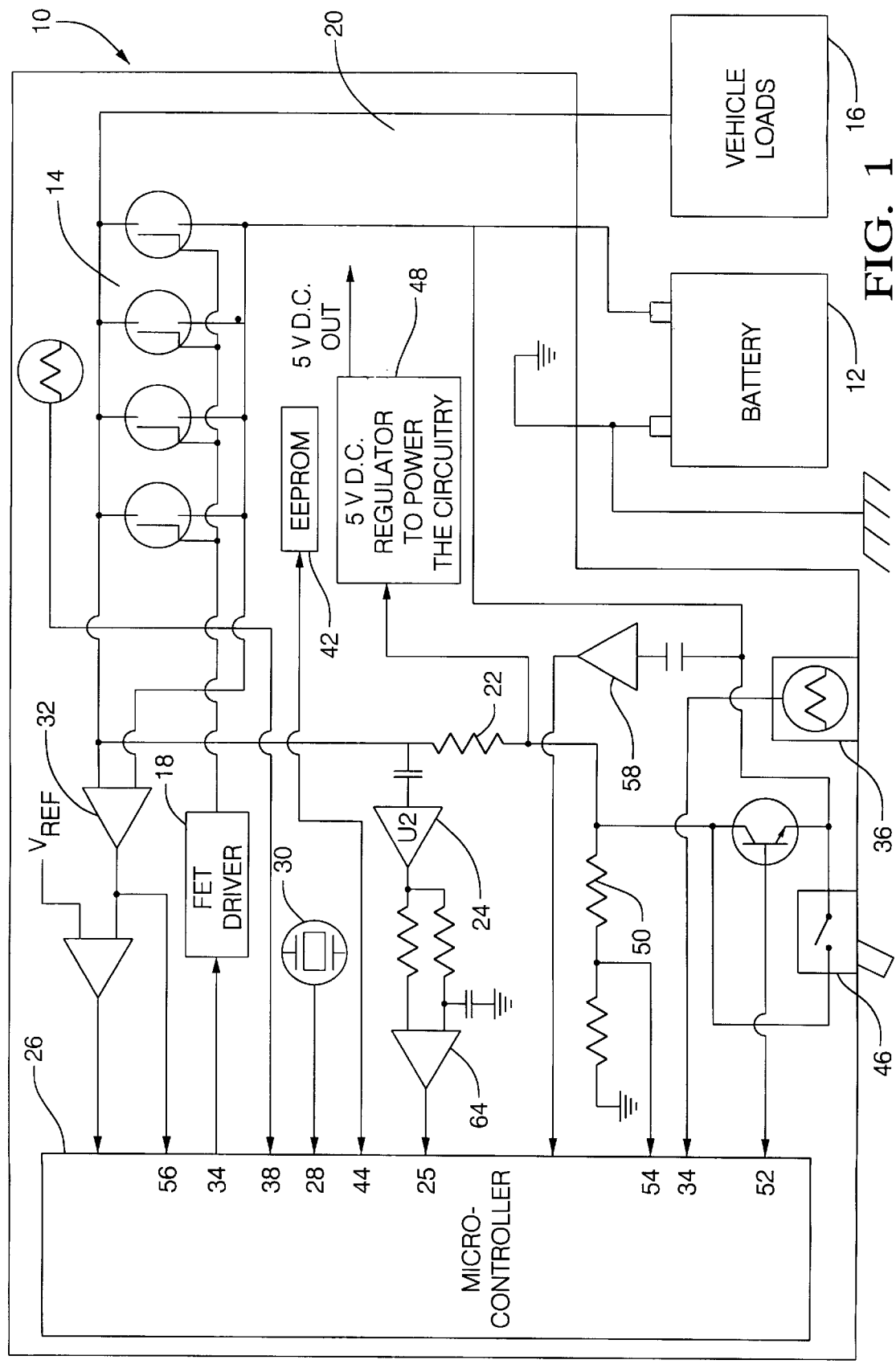
FIG. 1 illustrates a block diagram of an exemplary embodiment of the invention.

The purpose of the battery protection system is to protect the battery from discharge beyond the point where the remaining battery energy is capable of starting the engine. This is accomplished according to an algorithm stored in a microprocessor that measures, among other things, the battery voltage, the ambient temperature, and time. Based upon the values of these inputs the microprocessor will disconnect the battery from the load and/or electrical draw in order to preserve a minimal charge value, namely, a sufficient amount of charge to provide cranking power to the starter motor of the automobile. An automatic disconnect is latched by software, so that if the battery voltage recovers after the disconnection, the battery remains disconnected.

The battery protection system is also configured to have a "fail-safe" operation in order to prevent the disconnection of the battery in certain situations; for example, if the engine is running or the hazard lamps are active. The system also utilizes a means for discriminating the AC waveforms that appear through the battery terminals, as a result of engine ignition and hazard lamp activity. When these waveforms are present, the software using a pattern recognition algorithm to detect these conditions, will then inhibit the disconnection of the battery from occurring. For example, if the battery charging system should fail, allowing the battery to discharge below a point where the battery will be unable to restart the automobile and the engine is running, the battery would still be connected.

If the system has automatically disconnected the battery, it will automatically reconnect the battery when the system senses some electrical activity, such as the depression of the brake pedal (a function that illuminates the taillights), turning on the ignition (a function that manipulates the starter solenoid), and the activation of the vehicle hazard lamps. In other words, the system can detect when someone intends to start and drive the vehicle, and will accordingly, ensure that the battery is reconnected.

However and after a disconnect operation, the unit is prevented from detecting a reconnect condition for a time period of approximately 10 seconds after the system disconnects the battery. This waiting period is programmed in the software in order to allow the voltage on the 12V bus to "settle out" after the disconnection of the battery occurs.

When the battery is reconnected in response to a vehicle start up request, the system will allow up to 20 seconds for the engine to be started. Once 20 seconds has passed, and the battery charge is below the threshold level for providing a charge to the starter motor, the battery may again be disconnected automatically if the engine is not yet running or the hazard lamps are not active.

A second function of the battery protection system is to automatically disconnect the battery in the event of excessively high battery current. Excessively high current would result from a short-circuit to chassis of the 12V bus as could occur in an accident, or from connecting an external battery incorrectly in an effort to jump-start the car. A disconnection of this type is not inhibited even if the engine is on or the hazard lights are on. When this sort of battery disconnection occurs (as opposed to the low-battery disconnect), the software disallows an automatic reconnect. The only way to reconnect the battery in this situation is to cycle an on/off switch of the battery protection system.

The battery protection system on/off switch can be used to manually disconnect the battery from the car (OFF), which virtually eliminates any load presented to the battery (including the vehicle parasitic load). However, the unit will override this switch while the engine is running or the hazard lamps are active to prevent the driver from disconnecting the battery under these conditions. Also, the switch can be used to cause a reconnect if needed (switch to OFF, then ON).

The battery protection system only requires electrical connections at the battery terminals. No other electrical connections are required by virtue of the fact that the reconnect signal, the hazards-on signal, and the engine-on signal can all be detected through the battery terminals.

The battery protection system can be divided into seven sub-sections including: 1) battery disconnect-point determination; 2) over-current detection; 3) transparent reconnect detection; 4) engine-on/hazards-on detection; 5) FET-array and ambient air temperature detection; 6) FET gate control; and 7) Manual switch/switch override. The microcontroller receives input for sections 1 through 5, and provides output to sections 6 and 7.

Figure 2:
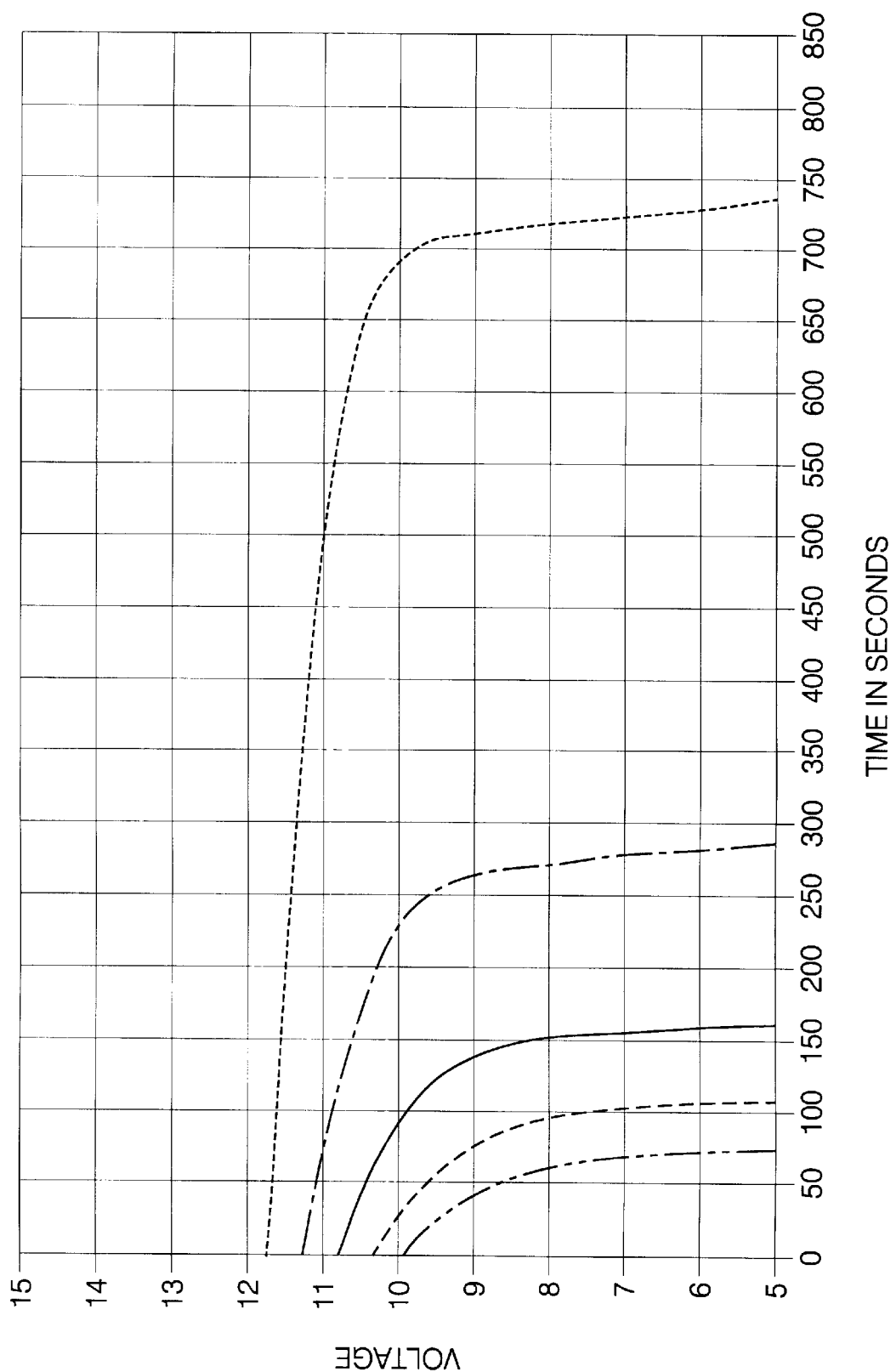
FIGS. 2 and 3 illustrate the drain on a battery under engine starting conditions.
Figure 3:
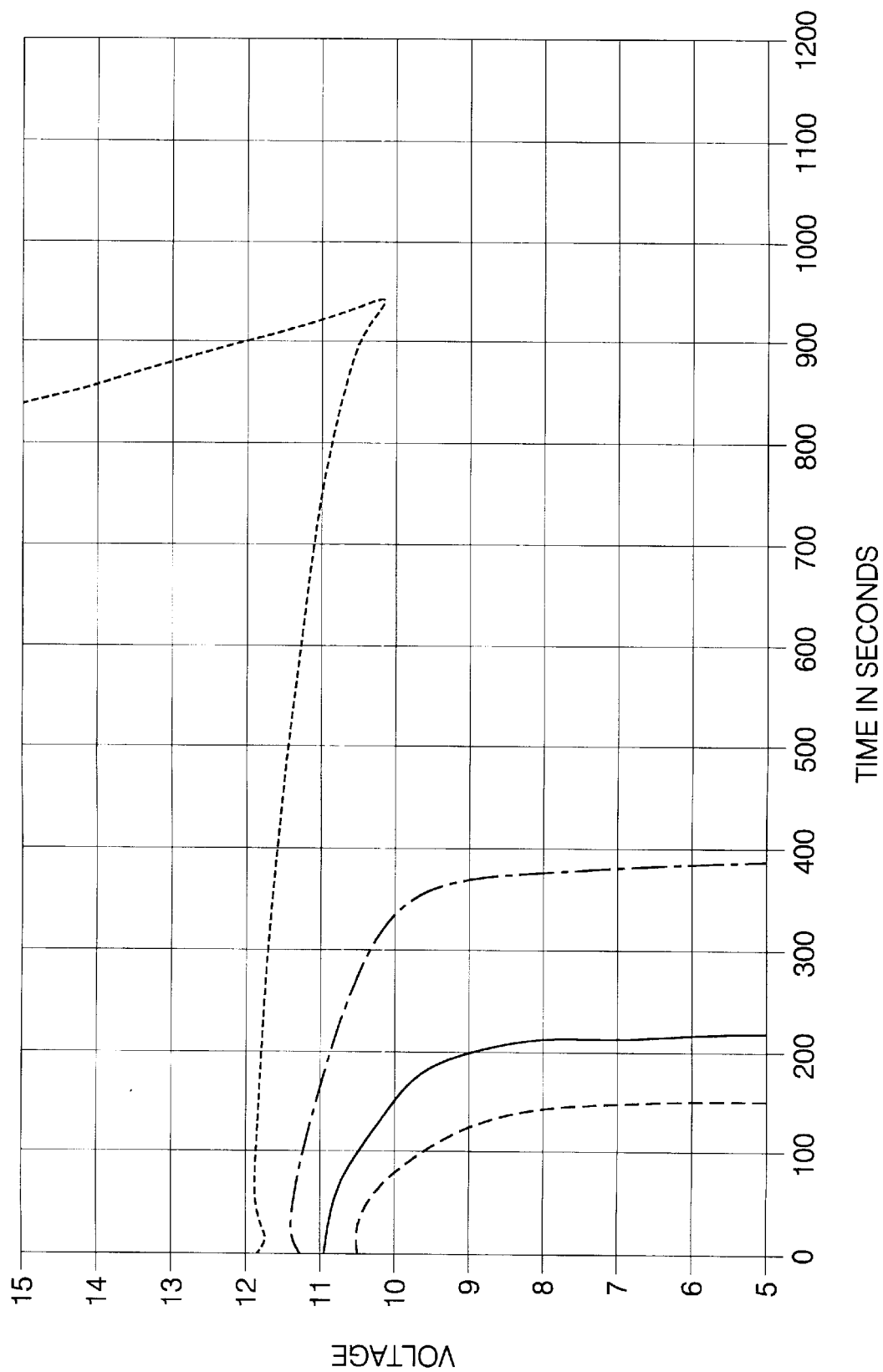
Figure 4:
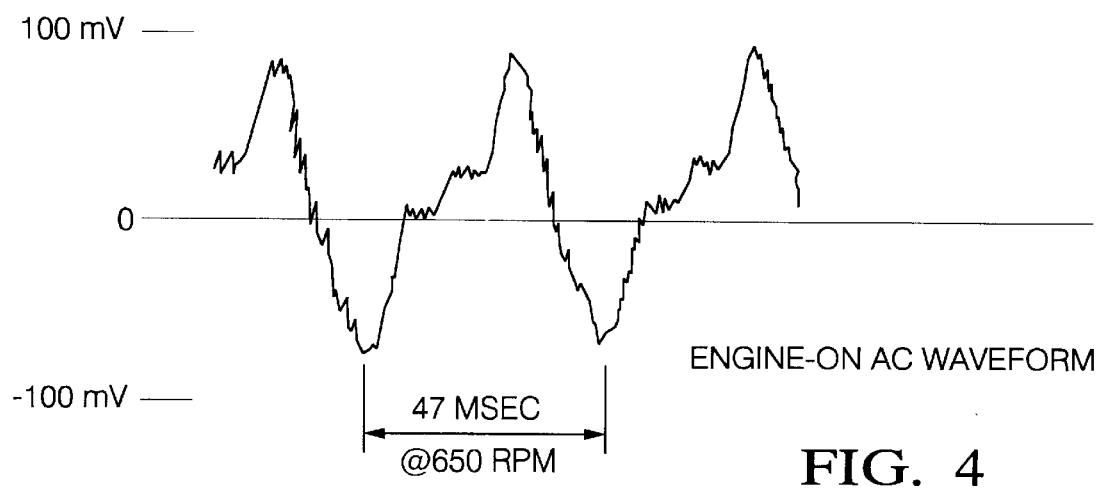
FIG. 4 illustrates a flow diagram of the exemplary embodiment of the invention.

The battery disconnect-point determination is accomplished in the microprocessor by measuring the time-rate-of-change of the battery voltage and the ambient temperature, and comparing these measurements to battery discharge curves stored in microprocessor memory. FIGS. 2 and 3 illustrate typical time-rate of change curves. The battery voltage is monitored by the microprocessor, via a voltage divider. If the state-of-charge of the battery is such that any further reduction in battery charge might disallow an engine start, the microprocessor will cause a field effect transistor (FET) array to turn off, thereby disconnecting the load from the battery.

The overcurrent detection is provided by a differential amplifier with inputs from the source and drain of the FET array. As such, the differential amplifier output is a voltage proportional to the current that flows through the FET array. A comparator output will go high if the FET current rises above the threshold, which is set at the negative input of an amplifier. Otherwise the amplifier output remains low. Whenever the amplifier output goes high, this will cause an immediate interrupt in software within the microprocessor, to which the microprocessor will respond by commanding the FET array to turn off. The microprocessor software will inhibit a reconnection from occurring after an overcurrent disconnection has occurred. The only way to turn the FET array back on in this case is to turn the battery protection system off and then back on with the manual on/off switch.

The transparent reconnect detection system operates after the FET array has been commanded off due to low battery charge, by having a 6.2K resistor that is in parallel with the FET array conduct up to 2 mA to the vehicle loads. When the driver steps on the brake pedal (or turns the ignition switch to "start", or turns on the hazard lamps), a step change in voltage occurs in the 6.2K resistor due to a fluctuation in the load that is presented to the battery protection system. This step-change in voltage is amplified by an amplifier U2C and then output to a second amplifier. One amplifier input is filtered by the RC network while the other input is not filtered. This causes a momentary voltage differential at the inputs of the amplifier, which causes the output of amplifier to go high momentarily whenever the step-change occurs. A high output from the amplifier will cause an immediate interrupt to occur in software if the FET array was turned off due to a low battery. Otherwise, any output from amplifier is ignored by the microprocessor. This is set in the software. The microprocessor will respond to this interrupt by turning the FET array on. The software will maintain the FET array on for at least twenty seconds (unless an overcurrent condition is detected) to allow the driver to start the car. After twenty seconds, another battery disconnect could occur if the car has not been started or the hazard lamps are not active.

The engine-on/hazard-lights-on detection sub-system uses the AC component of any signal that appears between the positive and negative battery terminals as an input and amplifies it and then transmits it to microprocessor, which then samples this waveform in real time. When the engine is running, the waveform has a profile that is unique with respect to frequency range and amplitude to any other components or conditions, which will create a signal between the positive and negative battery terminals. Similarly, and if the vehicle's hazard lamps are on, the waveform profile generated is also unique. The microprocessor compares the sampled waveform with data stored in memory in order to determine whether the engine is running or the hazard lamps are on. If either is the case, the software disallows a disconnection from occurring (except in the case of an overcurrent condition).

The FET gate control operates when the software determines that the FET array should be turned on (battery connected). The microprocessor commands that a circuit drive the gates of the FET array high. The circuitry contains a charge-pump, which provides an output that is about 11V above battery voltage. This is required to allow the use of N-channel FETs, which are significantly lower in cost than P-channel, but require that the gates be driven well above battery voltage in order to fully turn them on. Conversely, when the software determines that the FET array should be turned off (battery disconnected), the microprocessor commands the control circuitry to pull the FET gates to ground.

The manual switch and/or switch override is mounted on the side of the physical embodiment of battery protection system is used to power-up/down the battery protection system. All loads presented to the battery are removed when the switch is in the off position, except for the FET array leakage current. The switch off position would be selected when the car is to be in long-term storage, because it virtually eliminates the vehicle parasitic load from the battery, which can be 20 mA or more with the vehicle parked. Vehicle parasitic load can disable cranking ability in as little as two months.

However, it is important that the battery protection system is powered-up while the engine is running or the hazard lamps are active, in order to keep the battery connected. Therefore, a transistor in parallel with the manual switch, and is commanded by software to bypass the switch, thereby maintaining power while the engine is running or the hazard lamps are active.

Ambient and FET-array temperature detection is needed if the engine should fail to start as expected during cranking, since it would be possible to exceed the maximum allowable operating temperature of the FET array, leading to FET failure. To prevent this, a thermistor is attached to the FET array that provides a voltage proportional to temperature at the microprocessor. The microprocessor continuously samples this input, and if the temperature rises above the programmed limit, the FET array will be turned off (unless, of course, the engine is running or the hazard lamps are active). After the FET array has cooled adequately, the software will command the FET array to turn on again. Similarly, the ambient air temperature is monitored by the microprocessor, and used in the determination of the battery-disconnect point (see above).

The condition of the battery under load is a function of several factors including load, time under load, temperature of the battery, the age of the battery, the number of times the battery has been discharged and the level of discharge.

FIG. 1 is an exemplary embodiment of a complete battery protection system 10. There are several features of a battery protection system. These include: crank protection, short circuit protection, reverse polarity protection and storage mode protection.

A basic element of the battery protection system is the use of one or more electronic switches (FETs) in parallel that open and disconnect the vehicle electrical load under certain commands from the battery protection system. The advantage of an electronic switch over electrically controlled mechanical switches is freedom of arcing under high current conditions. Mechanical switches are also subject to contamination from environmental conditions that exist within a vehicle engine area.

Another key feature of the battery protection system is the reconnect of the battery that occurs without being evident to the user. The reconnect occurs under at least three programmed conditions. These include: depressing the brake pedal, ignition switch "START", and the activation of the hazard lights. A manual reconnect switch is available as a back up.

In addition, if the hazard lamps are activated or the engine is running, the battery protection system is inhibited from disconnecting the battery from the vehicle load.

FIG. 1 illustrates an exemplary embodiment of battery protection system 10. The positive terminal of a battery 12 is connected to a B+ input of a circuit board (not shown) of battery protection system 10. In addition, the positive terminal of battery 12 is also connected to the drain connections of a FET array 14. FET array 14 consists of a plurality of electronic switches (FETs) or gates. There are four such FETs in the exemplary embodiment since a single FET is not capable of handling the current load. However, and depending upon the current load or anticipated current load, fewer or more FETs may be used in array 14. Moreover, and if a single FET is capable of carrying the anticipated current load, a single FET can be used.

The sources of the FETs are connected to a vehicle load 16. In addition, the gates of array 14 are coupled to the output of a gate drive circuit or FET driver 18. Vehicle load 16 is also connected to a load sense input 20 of the battery protection system. The battery protection system of the instant application only requires three connections to the automobile wiring. This permits the battery protection system to be mounted onto the terminals of a battery with the positive connector of the load being connected to the output of the battery protection system. The output is electrically at the junction of the source terminals of the FETs and the junction noted as 20 in FIG. 1.

Fundamentally, the system provides a switch between the positive terminal of the battery and the load. The FET gate signals are such that for a given battery and load condition, the FETs are opened thus disconnecting the battery. It is important to note that resistor 22 is in parallel with the FET source and drain connections such that when the FETs create an open condition, a small amount of current less than 2 milliamperes flows from the battery through the load. An exemplary value of the resistor is 6 Kohms. When the FETs are open, a change on the load will appear as a voltage change on the load sense input 20. An amplifier U2 24 provides the voltage change to an interrupt input of a microprocessor 26.

An exemplary microprocessor is the 16C73 microprocessor made by Microchip Corporation. This voltage sensing can be used to detect an operator depressing a brake pedal or turning on the ignition switch. These actions instruct the microprocessor's output DOUT to instruct the FETs of array 14 to turn on via gate drive 18. Additionally, the microprocessor will instruct the FETs of array 14 turn on or stay closed, providing battery voltage to the load for starting the vehicle.

The main function of the battery protection system is to prevent the battery from being drained beyond its capability to start the vehicle. The battery condition is primarily a function of the batteries current charge and the battery drain under load over a period of time. The battery voltage is coupled to an analog-to-digital input of the microprocessor 26 via Q1, acting as a switch.

The microprocessor has a counter input 28 that is coupled to an oscillator 30 that provides time data to the microprocessor. In addition, the microprocessor receives an input from a differential amplifier 32 that provides a voltage difference between the FET drain voltage and the source voltage. This voltage is representative of the current drain by the load. It is not necessary for the detection to be highly accurate. For the purposes of the battery protection system, it is only necessary to know an order of magnitude such as less than 1 ampere, less than 10 amperes, less than 100 amperes, less than 1000 amperes or less than 2000 amperes.

A second analog-to-digital input 34 is coupled to a first thermistor circuit 36 to measure the battery temperature. As discussed above, the measured battery temperature is used by the microprocessor 26 to determine an appropriate battery voltage at which to operate the FETs of array 14.

A third analog-to-digital input 38 is coupled to a second thermistor circuit 40. This thermistor measures the temperature of the FETs in order to protect the FETs from damage from operating beyond their operating range. The temperature of concern is significantly above any ambient temperature that the automobile may find in use. The temperatures involved are excessive temperature caused by excessive current flow through the FETs. An exemplary value of FET temperature cut off is 150° C.

An EEPROM 42 provides the programming information to the microprocessor 26 via input 44. Included in this program are the characteristics of the battery type used with the vehicle. Based upon this programming, the system determines the battery voltage at which to disconnect the vehicle load.

The battery protection system has an ON/OFF switch 46 and a switch override transistor 40 in conjunction with microprocessor 26. When switch 46 is closed, the battery voltage is connected to a 5 volt regulator 48 that provides power to the circuitry of the system. In addition, it provides the battery voltage to a voltage divider 50 that is coupled to a VBAT input of the microprocessor, which converts the DC voltage to a digital signal representative of the battery voltage. An output 52 of microprocessor 26 provides a switch override function.

Using the battery voltage, the time of drain, the order of magnitude for the current drain and the battery temperature, the microprocessor determines a battery voltage level at which the gate drive 18 causes the FETs of array 14 to open and disconnect the vehicle load.

During normal operation of the vehicle, the vehicle's generator provides the power for operating the vehicle. This in turn keeps the voltage at VBAT at a level above the cutoff voltage determined by the system. When the engine is off and with no hazard light operation, the battery is subject to drainage depending upon the vehicle load caused by the operator's inadvertent actions, such as leaving the headlights, inside lights or other accessory equipment on. The system measures the drainage by measuring the drop in voltage over a period of time. The relative current level is also known by the measurement of the voltage across the FET drain to FET source terminals. Ambient air temperature is also known. This data is inputted to the microprocessor at terminals 54, 28, 34 and 56. If the microprocessor determines that a specific battery voltage has been reached, gate drive 18 instructs the FET switches to open and disconnect the vehicle load from the battery.

However, as indicated above if certain conditions exist, the microprocessor 26 is inhibited from disconnecting the vehicle load 16 from the battery 12. An amplifier 58 is connected to microprocessor 26 and provides an overriding function if the engine is on, being started or the hazard lights are on. Presence of these signals will inhibit the switching off of the FET switches. Additionally, amplifier 24 will detect the activation of either of these devices to switch the FETs back on if the FET switches are in the off position.

In addition, and if the operator depresses the foot brake when the FETs are in the off position, the depressing of the foot brake will close a switch that causes a rear light of the vehicle to attempt to illuminate. The illumination of the rear light will cause a change in the trickle current through resistor 22. The change is detected by amplifier 24 and the system will be instructed to wake up and reconnect the FET switches long enough for the operator to attempt to start the vehicle.

Accordingly, the amplifier and the microprocessor will detect the change in current through resistor 22, which is caused by that depression on the foot brake.

The system's method of sensing the presence of ignition, hazard light on and other known conditions allows a high degree of confidence in distinguishing engine on and hazard light condition from other electrical activity. The engine on condition creates a specific noise condition on the battery voltage that is detectable and different from other noise and transient conditions in a vehicle's electrical system.

Figure 5:
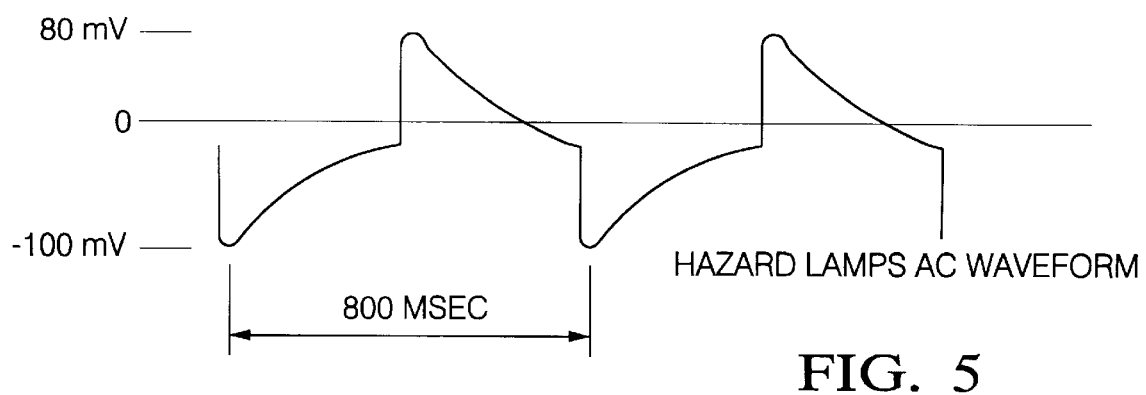
FIG. 5 illustrates an AC waveform of the battery voltage indicating an engine on condition.
Figure 6:
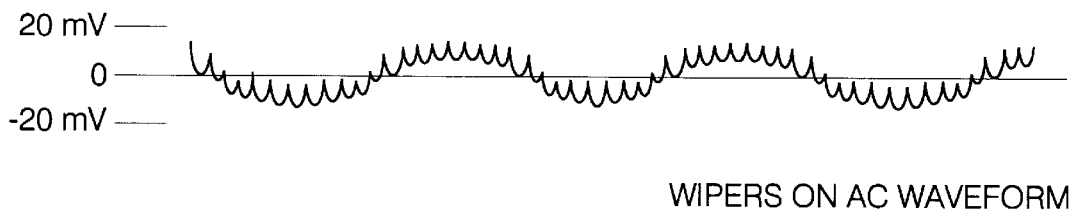
FIG. 6 illustrates an AC waveform of the battery voltage indicating a hazard lights AC waveform.

FIG. 5 illustrates the AC waveform created by the electrical system when the engine is on. FIG. 6 illustrates the AC waveform generated by the hazard lights when they are on. It is unlikely that any other part of the electrical system will generate an AC waveform with the AC amplitude exhibited by the engine on or hazard lamps condition. The circuitry of the amplifier that detects the load fluctuation, which initiates a battery reconnect is comprised of two parts.

The first part is an amplifier that amplifies the AC waveform existing across the vehicle electrical load at the junction 20 of the FETs source and the vehicle load. An exemplary value of 0.5 mv is a threshold at which the system detects an AC voltage change when the brake pedal is applied. The gain of the amplifier is 500 creating a threshold voltage of 0.25 volts. The second part is a comparator that inputs the amplified threshold voltage into a comparator. The comparator is set to create a square wave pulse into an interrupt pin of the microcontroller.

Amplifier 58 receives the AC component of the signal present at junction 20 due to the engine ignition or the hazard lamps activity. An exemplary minimum value would be 50 mV peak-to-peak. Amplifier 58 transmits this signal with a gain of 40 to a fourth analog-to-digital microprocessor input. The frequency and amplitude of this signal is a function of engine rpm or the on/off frequency of the hazard lights, and is discriminated by the microcontroller for use in inhibiting a battery disconnect.

Other systems depended on connection to one or more external circuits for creating a switch for reconnect of the system once the battery has been disconnected.

Figure 7:
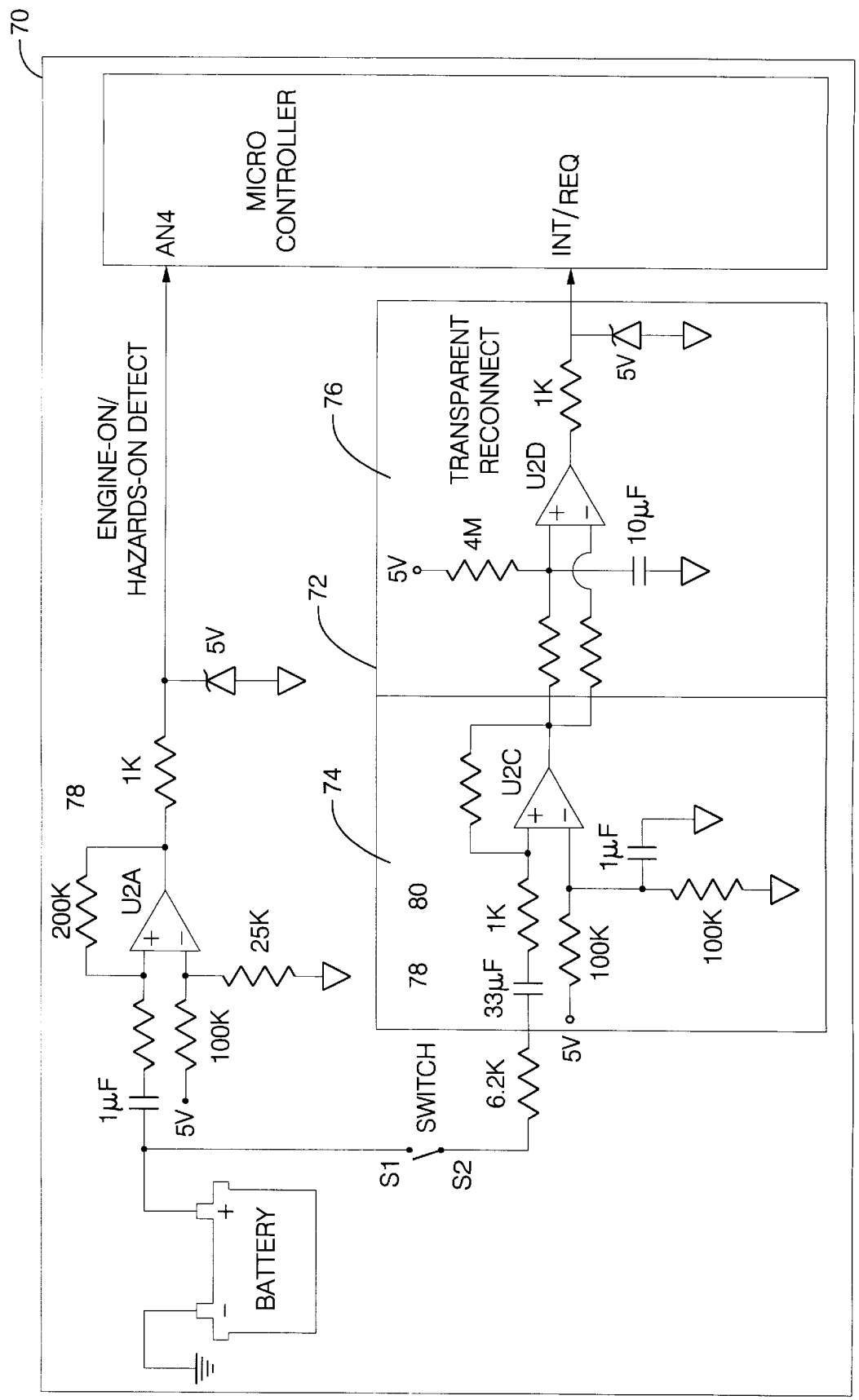
FIG. 7 illustrates a block diagram of a transparent reconnect subsystem.

FIG. 7 illustrates a subsystem 60 of the battery protection system. The transparent reconnect subsystem is based upon detection of a transient change to the DC level on the vehicle load. When the FET switches are in the off position, as discussed above, a trickle current flows from the battery through a resistor, with an exemplary value of 6000 ohms. As can be seen on FIG. 1, this resistor is electrically across the drain to source terminals of the FETs of array 14. When an operator opens the door, presses the brake pedal or turns on the ignition key, these actions create a transient change to the DC voltage level across the vehicle load. This is true even though the voltage across the vehicle load is considerably lower than the battery voltage, due to the presence of the 6000-ohm resistor in series between the battery and the vehicle load.

The transparent reconnect subsystem comprises an amplifier 62 and a comparator 64. The time constant of capacitor 66 and resistor 68 allows the comparator to discriminate the transient changes in the DC level at the junction of the vehicle load from normal electrical noise. This transient is amplified by operational amplifier U2C 24 and coupled to comparator 64. The values of amplification and comparator set levels are predetermined so that the comparator produces a reset pulse that is coupled to an interrupt/reset input 70 of the microprocessor 26.

As discussed above, depressing the brake pedal, for example, will create a transient on the vehicle load during those times the FET switches are open that is detected by the reconnect subsystem. If the battery protection system is operating in a mode whereby the FET switches are on, the microprocessor is programmed to ignore the pulses generated by the transparent reconnect subsystem.

Another embodiment of the system may include a memory system 72 that remembers the number of times and depth of discharge of the battery as well as the age of the battery and in turn provides a calculation of the battery life. This may be used to alert the operator that the battery may be nearing the end of its useful life. No additional input data is required. The EEPROM 42 may provide the data about the battery installed in the car. No additional circuitry is required due to the microprocessor's ability to write data to, and read the data from the EEPROM memory. It is advantageous to have a reset switch with the memory to be used when the battery is replaced.

Another feature of the system is a subsystem that detects a dead short between the positive terminal output across the vehicle load 16 and the negative terminal of the battery 12. Such a short would create an excessive current through the electronic switches of array 14. The excessive current is detected by a high current detection circuit 31, which instructs microprocessor 26 to open the electronic switches. This action removes the excessive load on the battery 12.

The present invention is particularly well suited for use in an electronics package that is powered by battery 12. For example, in a preferred and exemplary embodiment, the electronics package is part of a smart battery, wherein the electronics package is electrically connected to a terminal(s) of battery 12. The electronics package of the smart battery provides the user with a variety of functions and is capable of storing and monitoring information relating to battery performance and the like. The electronics package requires power to operate and thus is connected to the battery terminal. The terminal connector of the present invention preferably provides an electrical connection between an internal electrical distribution assembly (not shown) within the electronics package and a terminal of battery 12.

With the availability of large-scale integration it is likely that most of the circuitry involved with the battery protection system may be included within a single integrated circuit. The system may include one circuit board housing the control circuitry and a separate circuit board holding the FET switches. The entire unit may be packaged so that it can be mounted on the battery itself.

The embodiment of the invention shown in FIG. 1 also disconnects the battery from the load when a jump-start is performed incorrectly. A jump-start is defined as the starting of an internal combustion engine that has a weak or discharged battery by means of booster cables. An exemplary embodiment physical layout of the invention is such that the positive terminal of the battery is not accessible so long as the battery protection system is connected. However, the cable that normally is connected to the positive terminal of the battery is connected to an output terminal of the battery protection system and the negative terminal of the battery is connected to the chassis.

A vehicle having the battery protection system would hopefully never need a jump-start because of a discharged battery. However the circuitry of the system is such that an inadvertent reverse connection will cause the FET switches to open eliminating the cross connection. If an external source such as a charger, battery or the electrical system of another vehicle is connected such that the negative lead for the external source is connected at point A with the positive terminal of the external source connected to the chassis, the FETs will open, thus eliminating the short across the battery. Upon connection, the excessive current condition will be detected by differential amplifier 32, which causes the comparator output to go high, which causes an interrupt in the microcontroller. The microcontroller then causes the FET switch to open. This will prevent the arcing and other deleterious effects a reverse connection can cause.

Similarly, if due to a crash or other unusual event, a short circuit occurs with the vehicle load 16, as shown in FIG. 1, the current limiting functions described above will disconnect the load from the battery by opening the FET switches.

Figure 8:
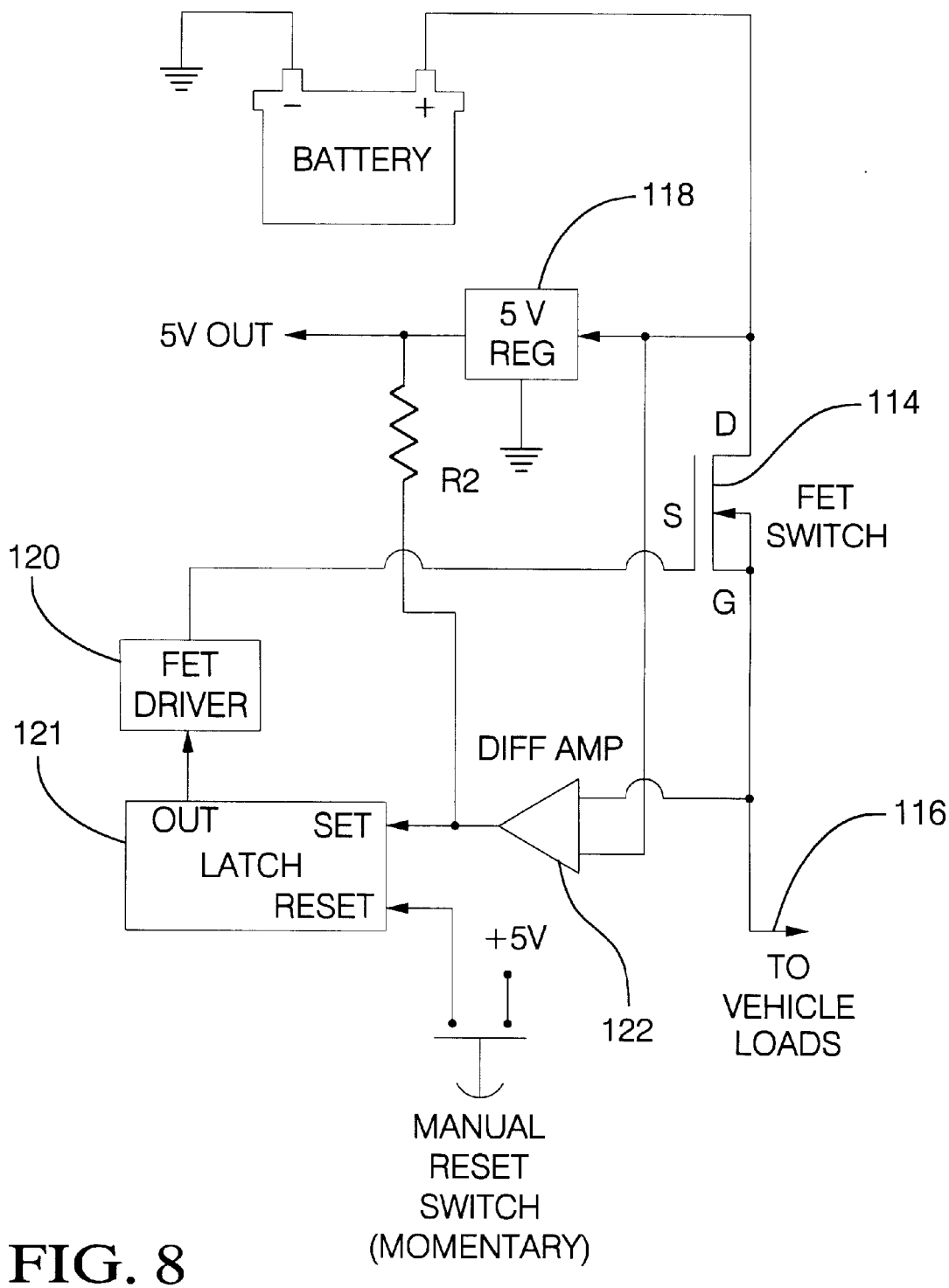
FIG. 8 illustrates an exemplary embodiment of a simplified jump-start protection system.

A simplified embodiment of the circuitry illustrated in FIG. 1 is shown in FIG. 8 as 110. This limited circuitry illustrates an embodiment that is limited to prevention of the deleterious effects from improper jump-starting and short circuits within the vehicle load 116. In this embodiment, the circuitry is limited to the FET switches of array 114, a regulated power supply 118, a High Current detector Differential Amplifier 122, a Latching Integrated Circuit 121, and a FET Gate Drive Circuit 120.

As discussed above, connecting an external source such as a charger, battery or another vehicle across points A and B, if inadvertently done incorrectly will cause excessive current to flow through the FET switches. The excessive current will be measured as a voltage by differential amplifier 122, which, at a predetermined set point will cause the Latching Integrated Circuit to apply "ground" to the gates of the FET switches of array 114 via Gate Drive circuit 120. This will cause the FET switches of array 114 to open, disconnecting the battery from the load, thus eliminating the short caused by the reverse connection or the short within the vehicle load. A manual reset switch would enable the user to reconnect battery. The current caused by such a short or reverse connection is in excess of the current required for starting the vehicle; therefore the predetermined value to cause the system to remove the battery is in excess of the starting current required. An additional optional feature of the short or jump-start facility of the simplified system or the full system is to include a LED or other display device to indicate a short or reverse battery condition.

Figure 9:
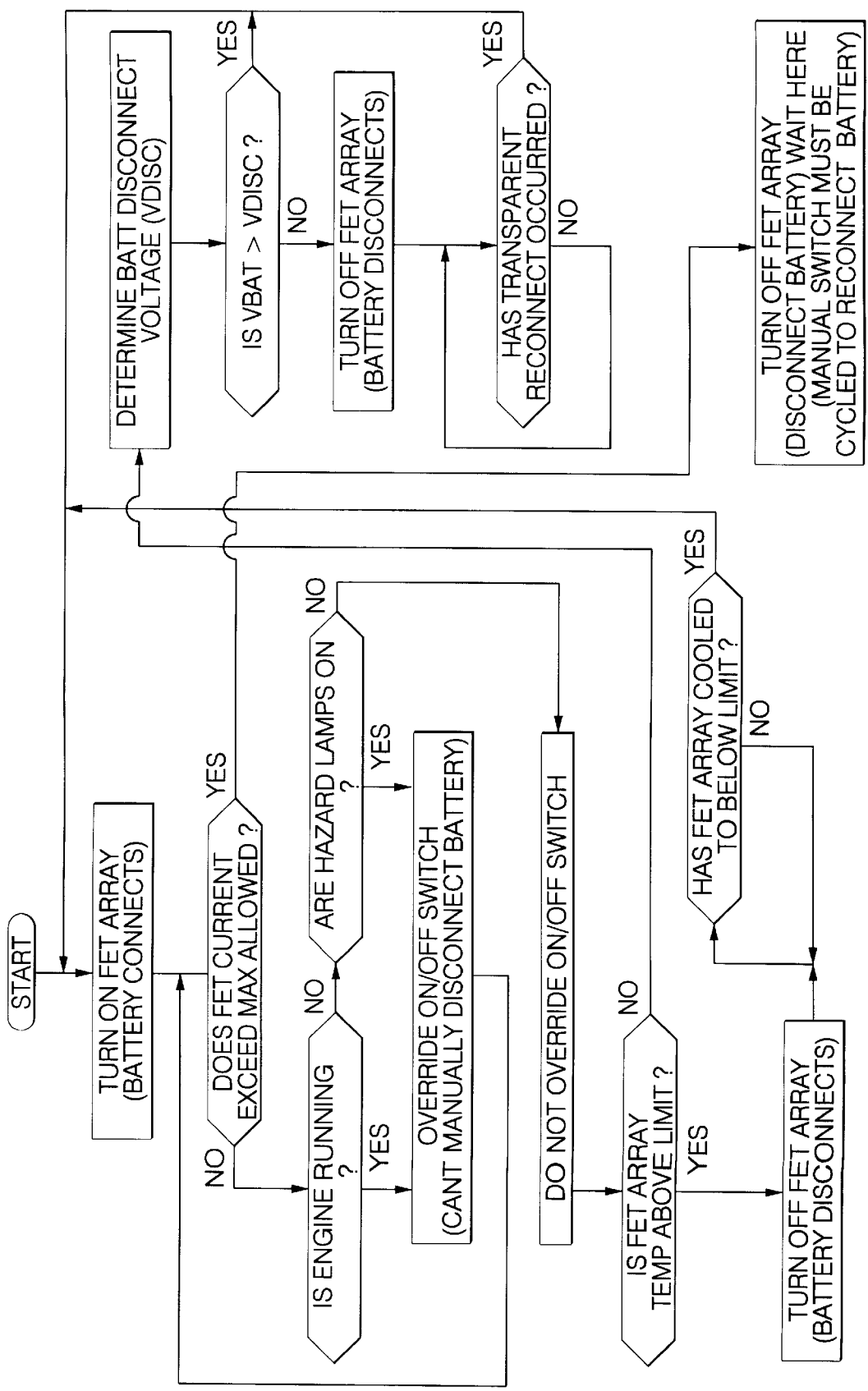
FIG. 9 is a flowchart illustrating portions of a command sequence employed by the control algorithm of the instant application.

Referring now to FIG. 9, a flowchart 210 illustrates portions of a command sequence employed by the control algorithms stored in the microprocessor of the smart battery system. A first step 212 depicts a reset or power up on the smart battery. A step 214 turns on the FET array and the battery is connected to an electrical load. After the FET array has been turned on, a decision node 216 determines whether the FET current exceeds or is greater than a maximum allowed FET current. If decision node 216 determines that the FET current exceeds the maximum allowable current, a step 217 turns off the FET array and the battery is disconnected from an electrical load. Step 217 instructs the smart battery system to stay in this position until the manual switch is cycled in order to reconnect the battery.

If the FET current does not exceed the maximum allowable current, a decision node 218 determines whether the vehicle engine is running, an operating condition in which it would be undesirable to have the override on/off switch operable. This is determined by utilizing signal processing and pattern recognition software wherein the unique waveform (FIG. 5) produced by the vehicle engine at the battery terminals is compared to profile signals that are stored in the memory of the EEPROM.

If decision node 218 determines that the engine is running, a step 220 overrides the on/off switch so that the vehicle battery cannot be manually disconnected and the system returns to decision node 216. This prevents the system from disconnecting the battery. The manual override is accomplished by step 220 that turns on a transistor that is parallel to the manual on/off switch.

If on the other hand decision node 218 determines that the engine is not running, a decision node 222 determines whether the hazard lamps of the vehicle are on, which is another operating condition in which it would be undesirable to have the override on/off switch operable. This is also determined by utilizing signal processing and pattern recognition software wherein the unique waveform produced by the hazard lamps (FIG. 6) at the battery terminals is compared to profile signals that are stored in the memory of the EEPROM.

The sensing of the engine on and hazard lamps active signal is accomplished by discriminating the profile of the electrical activity that is impressed upon the 12V bus due to the ignition system or the hazard lamps. The circuitry for discriminating ignition or hazard lamp activity separates the AC component due to the ignition system from the total DC. The AC signal is then conditioned for input into the microcontroller. The microcontroller determines whether the signal is consistent with the expected engine-on profile or the hazard lamps signal, or if the signal is due to some other electrical activity such as the radiator fan motor, the ventilation blower motor, etc.

Accordingly, and if it has been determined that the vehicle hazard lamps are on, step 220 overrides the on/off switch so that the vehicle battery cannot be manually disconnected and the system returns to decision node 216. If on the other hand decision node 222 determines that the hazard lamps are not on, a step 224 does not override the on-off switch of the system.

Accordingly, and based upon the profile incorporated into the microcontroller, the battery can be disconnected only if the engine is not on or the hazard signals are not active.

After step 224, a decision node 226 determines whether the temperature of the FET array is greater than a temperature limit. If so, a step 228 turns off the FET array and disconnects the battery.

Once the battery has been disconnected due to the FET array being above the temperature limit a decision node 230 determines whether the FET array has cooled to a point below the temperature limit. Once decision node 230 has determined that the FET array has cooled below the temperature limit, the system returns to step 214.

If on the other hand decision node 226 determines that the temperature of the FET array is less than the temperature limit, a step 232 determines a disconnect battery voltage value (VDISC). The disconnect voltage value is determined by a computer algorithm or software program that is stored in the microcontroller of the smart battery system. The software periodically stores a series of battery voltage readings over time, thereby determining a value for the time-rate-of-change of voltage. The software will also measure and store the temperature readings. The software then compares these two values to a lookup table stored in the EEPROM or alternatively, applies a formula. From this comparison (or calculation), a prediction of the minimum allowable battery voltage can be determined. A unique feature of this method is that it does not require the battery current to be measured. The battery current (or battery load) is known due to the fact that the time-rate-of-change of the battery voltage is known. This methodology is used in lieu of measuring battery current. Accordingly, the cost and complexity of measuring the current is not required. This allows the smart battery system to perform such calculations while also being relatively inexpensive.

Once the calculations of step 232 are completed, a decision node 234 determines whether the battery voltage (VBAT) is greater than the disconnect battery voltage (VDISC, determined by step 232) has been reached. If so, the system returns to step 214. If on the other hand the battery voltage is less than or equal to the battery disconnect voltage, a step 236 turns off the FET array and the battery is disconnected.

After the battery has been disconnected by step 236, a decision node 238 determines whether the battery has been reconnected through the transparent reconnection of the instant application such as the depression of the vehicle brake pedal, turning of the ignition switch or activation of the hazard lamps Referring back now to FIG. 1 and in summation, the smart battery system of the instant application can be divided into seven sections:

1. Battery disconnect-point determination
2. Overcurrent detection

3. Transparent reconnect detection
4. Engine-on/hazards-on detection
5. FET-array and ambient air temperature detection
6. FET gate control
7. Manual switch/switch override Here microcontroller 26 receives input for sections 1–5 (identified above) and provides an output to sections 6 and 7 (also identified above).

The battery disconnect-point determination is accomplished in the microcontroller by measuring the time-rate-of-change of the battery voltage and the ambient temperature, and comparing these measurements to the battery discharge curves stored in the memory of microcontroller 26. Battery voltage is monitored by the microcontroller 26 via the voltage divider. If the state-of-charge of the battery is such that any further reduction in battery charge might disallow an engine start, microcontroller 26 will cause the FET array to turn off, thereby disconnecting the load from the battery.

The overcurrent detection is accomplished by a differential amplifier receiving inputs from the source and drain of the FET array; as such the differential amplifier output is a voltage proportional to the current that flows through the FET array. The comparator output will go high if the FET current rises above the threshold that is set at the negative input of the comparator; otherwise the output remains low. Whenever the output goes high, this will cause an immediate interrupt in the software, to which microcontroller 26 will respond by commanding the FET array to turn off. The microcontroller software will inhibit a reconnect from occurring after an overcurrent disconnect has occurred; the only way to turn the FET array back on in this case is to turn the smart battery unit off and then back on with the manual on/off switch.

With regard to transparent reconnect detection, after the FET array has been commanded off due to a low battery charge, the 6.2K resistor that is in parallel with the FET array can conduct up to 2 mA to the vehicle loads. Accordingly, when the driver steps on the brake pedal (or turns the ignition switch to "start", or turns on the hazard lamps), a step change in voltage occurs in the 6.2K resistor due to a fluctuation in the load that is presented to the smart battery system. This step-change in voltage is amplified by 24 and then outputted to 64. One input is filtered by the RC network of the resistors and capacitor and the other input is not filtered, this causes a momentary voltage differential at the input of 64, which causes the output of 64 to go high momentarily whenever the step-change occurs. A high output from 64 will cause an immediate interrupt to occur in the software of the microcontroller, only if the FET array was turned off due to a low battery. Otherwise, any output from 64 is ignored by the microcontroller as this is set in the software of the microcontroller. The microcontroller will respond to this interrupt by turning the FET array on. The software will maintain the FET array on for at least 20 seconds (unless an overcurrent condition is detected) to allow an operator to start the vehicle. After 20 seconds, another battery disconnect could occur if the car has not been started or the hazard lamps are not active.

Concerning engine-on/hazards-on detection, the AC component of any signal that appears between the positive and negative battery terminals is inputted to amplifier 58, which amplifies the signal and transmits it to the microcontroller, which then samples this waveform in real-time. When the engine is running, the waveform has a profile that is unique with respect to the frequency range and amplitude (FIG. 5). Similarly, when the hazard lamps are on, the waveform profile is also unique (FIG. 6). The microcontroller compares the sampled waveform with the data stored in the memory to determine when the engine is running or the hazard lamps are on. If either condition exists, the software will disallow a disconnect from occurring, except in the case of an overcurrent condition.

FET gate control, when the software has determined that the FET array should be turned on (battery connected), the microcontroller commands that the gate driver drive the gates of the FET array high. The gate driver contains a charge-pump, which provides an output that is about 11V above the battery voltage. This is required to allow the use of N-channel FETs, which are significantly lower in cost than P-channel FETs, but require that the gates be driven well above battery voltage in order to fully turn them on. Conversely, and when the software determines that the FET array should be turned off (battery disconnected), the microcontroller commands gate driver to pull the FET gates to ground.

Manual switch/switch override, the manual switch mounted on the side of the smart battery, is used to power-up/down the smart battery unit. All loads presented to the battery are removed when the switch is in the off position, except for the FET array leakage current. The switch off position would be selected when the car is to be placed in long-term storage, because it virtually illuminates the vehicle parasitic load from the battery, which can be 20 mA or more with the vehicle parked. Vehicle parasitic load can disable cranking ability in as little as two months.

However, it is important that the smart battery unit remains powered-up while the engine is running or the hazard lamps are active, in order to keep the battery connected. Therefore, Q1 is in parallel with the manual switch, and is commanded by the software of the microcontroller to bypass the switch, thereby maintaining power while the engine is running or the hazard lamps are active.

Ambient and FET array temperature detection, if the engine should fail to start as expected during cranking, it would be possible to exceed the maximum allowable operating temperature of the FET array, leading to FET failure. In order to prevent this, a thermister is attached to the FET array that provides a voltage proportional to the temperature to the microcontroller). The microcontroller continuously samples this input, and if the temperature rises above the programmed limit, the FET array will be turned off (unless the engine is running or the hazard lamps are active). After the FET array has cooled adequately, the software will command the FET array to turn on again. Similarly, the ambient air temperature is monitored by the microcontroller (24) and is used in the determination of the battery-disconnect point.

It is, of course, contemplated that the values of the resistors and capacitors of the system may vary, as applications may require.

Accordingly, and through the use of the detection system of the instant application, the sensing of on/off status of engine and hazard signals is determined without using any additional sensors. There is no requirement for an additional wire to be connected from the ignition key switch and/or the hazard switch to the smart battery electronics. This is particularly advantageous in aftermarket applications wherein access to the automobile electronics is very limited. In addition, this method also allows the detection system to be installed with a reduced labor and component cost as opposed to other engine status and hazard signal sensing devices.

The engine-on status must be confirmed even in the case of a failed generator output. This precludes merely monitoring the generator output voltage to verify that the engine is running.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A battery discharge protection system comprising:
    a) a microprocessor being capable of receiving a plurality of inputs, said inputs corresponding to signals from a vehicle;
    b) a plurality of electronic switches being configured for movement between an open position and a closed position, said closed position connecting an electrical load to said battery, said open position disconnecting said electrical load from said battery; and
    c) a gate input circuit for manipulating said switches between said open and closed positions in response to an output received from said microprocessor.

2. A battery protection system for a battery, comprising:
    a) a switching mechanism positioned intermediate to the positive terminal of a battery and an electrical load;
    b) a controller for manipulating said switching mechanism between an open position and a closed position, said closed position connecting said electrical load to said battery and said open position disconnecting said electrical load from said battery; and
    c) a battery state-of-charge detection system, said battery state-of-charge protection system instructs said controller to open said switching mechanism when said battery state-of-charge detection system detects a battery state-of-charge that is lower than a threshold value.

3. A battery protection system as in claim 2, further comprising:
    d) a vehicle status detection system, said vehicle status detection system instructs said controller to close said switching mechanism when a vehicle startup condition is detected by said vehicle status detection system.

4. A battery protection system as in claim 2, further comprising:
    d) a manual override switch for disconnecting said battery from said electrical load.

5. A battery protection system as in claim 2, wherein said state of charge protection system instructs said controller to close said switching mechanism when a battery re-connect condition is detected by said vehicle status detection system.

6. A battery protection system as in claim 5, wherein said battery re-connect condition is a depression of a brake pedal which illuminates a taillight, the illumination of said taillight causing a current fluctuation which is detected by said state of charge protection system.

7. A battery protection system as in claim 6, wherein said vehicle startup condition is the movement of an ignition switch from an off position to a start position, said start position causes a starter motor to activate, the activation of said starter motor causes a current fluctuation which is detected by said vehicle status detection system.

8. A battery protection system as in claim 5, wherein said vehicle startup condition is the opening of a car door which illuminates an interior light, the illumination of said interior light causes a current fluctuation which is detected by said vehicle status detection system.

9. A battery protection system as in claim 2, further comprising:
    d) a vehicle status detection system, said vehicle status detection system instructs said controller to close said switching mechanism when a vehicle startup condition is detected by said vehicle status detection system: and
    e) a controller bypass system, said controller bypass system prevents said controller from opening said switching mechanism when a critical vehicle system is in operation.

10. A battery protection system as in claim 9, wherein said critical vehicle system is the activation of a hazard light of an automobile.

11. The battery protection system as in claim 10, wherein said hazard light of said automobile produces an AC waveform across a pair of terminals of said battery and said AC waveform is measured by said vehicle status detection system.

12. A battery protection system as in claim 9, wherein said critical vehicle system is an engine, which is running.

13. The battery protection system as in claim 12, wherein said engine of said automobile produces an AC waveform across a pair of terminals of said battery and said AC waveform is measured by said vehicle status detection system.

14. A method for maintaining a minimal charge value within a battery, comprising:
    a) measuring the charge of said battery; and
    b) disconnecting said battery from an electrical load when the charge of said battery approaches a minimal threshold value.

15. The method as in claim 14, wherein said minimal threshold value is a minimal charge sufficient to start an automobile engine.

16. The method as in claim 15, wherein a system controller utilizing an electronic switch disconnects said battery from said electrical load.

17. The method as in claim 14, wherein said system controller is prohibited from disconnecting said battery when said battery is installed in an automobile and the engine is running.

18. A device for protecting an automobile lead-acid battery from an over-discharged condition due to an electrical load, said device comprising:
    a) an electronic switch interposed between a battery output terminal and any battery electrical load;
    b) a means for determining the state-of-charge of said battery as a function of the discharge due to said electrical load;
    c) a means for determining the battery voltage below which the continued reduction in said state-of-charge of said battery would result in an over-discharged condition;
    d) a means for causing said electronic switch to transition from a closed-circuit condition to an open-circuit condition, thereby preventing said over-discharged condition; and
    e) a means for causing said electronic switch to transition from said open-circuit condition to said closed-circuit condition when a fluctuation in said load occurs.

19. The battery protection system as in claim 18, wherein said controller is prohibited from manipulating said switching mechanism when a discrete waveform is detected by said vehicle status detection system.

20. The battery detection system as in claim 19, wherein said discrete waveform is an AC waveform produced by a running automobile engine.

21. The battery detection system as in claim 20, wherein said discrete waveform is an AC waveform produced by flashing hazard lamps of an automobile.

22. A method for maintaining a minimal charge value within a battery, comprising:
   a) periodically measuring the charge of said battery;
   b) determining a value depicting the time rate of change of a battery voltage;
   c) measuring ambient temperature of said battery;
   d) comparing the time rate of change of a battery voltage and the ambient temperature reading to a plurality of values stored in a lookup table and determining a minimal threshold value; and
   e) disconnecting said battery from an electrical load when the charge of said battery approaches said minimal threshold value.

23. The method as in claim 22, wherein a formula is applied to the time rate of change value and ambient temperature in order to determine said minimal threshold value.

24. A method for maintaining a minimal charge value within a battery, comprising:
   a) periodically measuring the charge of said battery;
   b) storing the measured charges of said battery;
   c) determining a value depicting the time rate of change of a battery voltage;
   c) measuring ambient temperature of said battery;
   d) comparing the time rate of change of a battery voltage and the ambient temperature reading to a plurality of values stored in a lookup table and determining a minimal threshold value; and
   e) disconnecting said battery from an electrical load when the charge of said battery approaches said minimal threshold value.

25. The method as in claim 24, further comprising:
   f) prohibiting the disconnection of said battery when a critical vehicle function is enabled.

26. The method as in claim 25 wherein said critical function is an automobile engine.

27. A method for maintaining a minimal charge value within a battery, comprising:
   a) determining if a current of a switching mechanism between a battery and a load exceeds a maximum value, if the current of said switching mechanism exceeds a maximum value the battery is disconnected from the load;
   b) determining if an automobile engine is running, if the automobile engine is running the current of said switching mechanism is determined again;
   c) determining if a hazard lamp of an automobile is operating, if the hazard lamp is enabled the current of said switching mechanism is determined again;
   d) overriding a manual shut off switch if said automobile engine is running or said hazard lamp is operating;
   e) determining if a maximum temperature of said switching mechanism is exceeded, if the maximum temperature is exceeded the battery is disconnected from the load;
   f) comparing a battery voltage and an ambient temperature reading of said battery to a plurality of values stored in a lookup table and determining a minimal threshold value; and
   e) disconnecting said battery from an electrical load when the charge of said battery approaches said minimal threshold value.

* * * * *